United States Patent
Linnen et al.

(10) Patent No.: US 12,205,252 B2
(45) Date of Patent: Jan. 21, 2025

(54) NON-VOLATILE MEMORY DIE WITH BIT-FLIP OBJECT INSERTION

(71) Applicant: Western Digital Technologies, Inc., San Jose, CA (US)

(72) Inventors: Daniel Joseph Linnen, Naperville, IL (US); Ramanathan Muthiah, Bangalore (IN); Kirubakaran Periyannan, Saratoga, CA (US); Nikita Thacker, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 393 days.

(21) Appl. No.: 17/847,101

(22) Filed: Jun. 22, 2022

(65) Prior Publication Data

US 2023/0419464 A1 Dec. 28, 2023

(51) Int. Cl.
*G06V 10/00* (2022.01)
*G06T 5/50* (2006.01)
(Continued)

(52) U.S. Cl.
CPC .......... *G06T 5/50* (2013.01); *G06T 7/194* (2017.01); *G06T 7/90* (2017.01)

(58) Field of Classification Search
CPC .. G06T 5/50; G06T 7/90; G06T 7/194; G06T 11/60; G06T 2207/30148; G06F 3/0628;
(Continued)

(56) References Cited

U.S. PATENT DOCUMENTS 5,050,095 A 9/1991 Samad
5,566,344 A * 10/1996 Hall .................... G06F 15/7814
712/37

(Continued)

FOREIGN PATENT DOCUMENTS

CN 113516172 A 10/2021

OTHER PUBLICATIONS

Kim, Minsu, "Non-Volatile Neuromorphic Computing based on Logic-Compatible Embedded Flash Memory Technology", University of Minnesota's Digital Conservancy; Jul. 2020; https://conservancy.umn.edu/handle/11299/216877; 3 pages.

(Continued)

*Primary Examiner* — Amir Alavi
(74) *Attorney, Agent, or Firm* — LOZA & LOZA, LLP; Gabriel Fitch

(57) ABSTRACT

Bit-flip object insertion techniques are provided for use with a non-volatile memory (NVM) wherein an object is inserted into a background image by flipping or inverting one or more bits within the pixels of the background image that correspond to the shape and insertion location of an object being inserted. In an illustrative example, pixels within the background image that correspond to the shape and insertion location of the object are XORed with binary 1s. This flips the bits of those pixels to change the color (hue) and/or intensity (brightness) of the pixels so the object appears in the background image. In other examples, only the most significant bits of pixels in the background image are inverted (flipped). Exemplary latch-based procedures are described herein for high-speed processing on an NVM die. Multiple plane NVM die implementations are also described for massive processing.

23 Claims, 12 Drawing Sheets

(51) Int. Cl.
*G06T 7/194* (2017.01)
*G06T 7/90* (2017.01)

(58) Field of Classification Search
CPC .... G06F 3/0604; G06F 3/0679; G06F 3/0619; G06F 3/0658; G06F 3/0685; G06F 11/1012; G03F 7/70616; G03F 7/7065
See application file for complete search history.

(56) References Cited

U.S. PATENT DOCUMENTS

| | | | |
|---|---|---|---|
| 7,313,550 | B2 | 12/2007 | Kulkarni et al. |
| 8,233,303 | B2* | 7/2012 | Best ............... H01L 25/18 365/51 |
| 8,341,500 | B2* | 12/2012 | Byom ............... G11C 16/26 714/763 |
| 8,345,295 | B2 | 1/2013 | Kim |
| 9,239,691 | B2 | 1/2016 | Lam |
| 9,336,483 | B1 | 5/2016 | Abeysooriya et al. |
| 9,613,715 | B2* | 4/2017 | Frayer ............... G11C 29/08 |
| 9,875,440 | B1 | 1/2018 | Commons |
| 10,180,820 | B2 | 1/2019 | Buchanan et al. |
| 10,356,320 | B2 | 7/2019 | Shirota et al. |
| 10,552,936 | B2 | 2/2020 | Li |
| 11,064,194 | B2 | 7/2021 | Muthiah |
| 11,625,191 | B2* | 4/2023 | Hazeghi ............. G06F 3/0653 711/103 |
| 11,816,343 | B2* | 11/2023 | Sharma ............. G06F 3/0626 |
| 2011/0222735 | A1 | 9/2011 | Imai et al. |
| 2013/0002828 | A1* | 1/2013 | Ding ............... G02B 17/0836 348/335 |
| 2019/0311267 | A1 | 10/2019 | Qin et al. |
| 2020/0097807 | A1 | 3/2020 | Knag et al. |
| 2020/0117539 | A1 | 4/2020 | Sun et al. |
| 2020/0134443 | A1 | 4/2020 | Qin |
| 2020/0184335 | A1 | 6/2020 | Rom et al. |
| 2021/0096751 | A1 | 4/2021 | Berman et al. |
| 2021/0110244 | A1 | 4/2021 | Hoang et al. |
| 2021/0304009 | A1 | 9/2021 | Bazarsky et al. |
| 2021/0312959 | A1 | 10/2021 | Shan et al. |
| 2023/0116755 | A1* | 4/2023 | Linnen ............... G06F 3/0688 711/114 |
| 2023/0315913 | A1* | 10/2023 | Chandra ............. G06F 21/572 726/26 |
| 2023/0418481 | A1* | 12/2023 | Linnen ............... G11C 29/50 |
| 2023/0419464 | A1* | 12/2023 | Linnen ............... G06T 1/60 |
| 2023/0420006 | A1* | 12/2023 | Linnen ............... G11C 11/54 |

OTHER PUBLICATIONS

Lee, Sung-Tae et al., "Neuromorphic Computing Using NAND Flash Memory Architecture With Pulse Width Modulation Scheme", Frontiers in Neuroscience: Neuromorphic Engineering; Sep. 18, 2020; https://www.frontiersin.org/articles/10.3389/fnins.2020.571292; 9 pages.

Shim, Wonbo et al., "Architectural Design of 3D NAND Flash based Compute-in-Memory for Inference Engine", MEMSYS 2020: The International Symposium on Memory Systems; Sep. 2020; https://dl.acm.org/doi/10.1145/3422575.3422779; 3 pages.

Wang, Yin et al., "An in-memory computing architecture based on two-dimensional semiconductors for multiply-accumulate operations", Nature Communications; Jun. 7, 2021; https://www.nature.com/articles/s41467-021-23719-3; 28 pages.

Amirsoleimani, Amirali et al., "In-Memory Vector-Matrix Multiplication in Monolithic Complementary Metal-Oxide-Semiconductor-Memristor Integrated Circuits: Design Choices, Challenges, and Perspectives", Advanced Intelligent Systems; vol. 2, Issue 11; Aug. 23, 2020; https://onlinelibrary.wiley.com/doi/full/10.1002/aisy.202000115; 48 pages.

Haj-Ali, Ameer et al., "Imaging: In-Memory AlGorithms for Image processiNG", IEEE Transactions on Circuits and Systems I: Regular Papers; vol. 65, Issue 12; Dec. 2018; https://ieeexplore.ieee.org/document/8398398; 14 pages.

Zhang, Jintao et al., "In-Memory Computation of a Machine-Learning Classifier in a Standard 6T SRAM Array", IEEE Journal of Solid-State Circuits; vol. 52, Issue 4; Apr. 2017; https://ieeexplore.ieee.org/abstract/document/7875410; 10 pages.

"An On-device Deep Neural Network for Face Detection", Apple Machine Learning Research; Nov. 2017; https://machinelearning.apple.com/research/face-detection; 10 pages.

Kim, Sung et al., "Matic: Learning Around Errors for Efficient Low-Voltage Neural Network Accelerators", 2018 Design, Automation & Test in Europe Conference & Exhibition; Mar. 19-23, 2018; https://ieeexplore.ieee.org/document/8341970; 6 pages.

Tsai, Li-Huang et al., "Robust Processing-In-Memory Neural Networks via Noise-Aware Normalization", Nov. 24, 2020; https://arxiv.org/pdf/2007.03230.pdf; 7 pages.

He, Ruiquan et al., "Artificial Neural Network Assisted Error Correction for MLC NAND Flash Memory", Aug. 2021; https://www.ncbi.nlm.nih.gov/pmc/articles/PMC8398337; 19 pages.

Sraw, Jashanpreet Singh et al., "Using Convolutional Neural Networks for fault analysis and alleviation in accelerator systems", Dec. 5, 2021; https://arxiv.org/abs/2112.02657; 8 pages.

Ozen, Elbruz et al., "Low-Cost Error Detection in Deep Neural Network Accelerators with Linear Algorithmic Checksums", Journal of Electronic Testing; Jan. 6, 2021; https://link.springer.com/article/10.1007/s10836-020-05920-2; 16 pages.

Wang, Chen et al., "Neural network based silent error detector", 2018 IEEE International Conference on Cluster Computing; Sep. 10-13, 2018; https://ieeexplore.ieee.org/document/8514878; 10 pages.

Xiao, Patrick T. et al., "Analog architectures for neural network acceleration based on non-volatile memory", Applied Physics Reviews 7; Jul. 9, 2020; 35 pages <https://aip.scitation.org/doi/10.1063/1.5143815>.

Hasan, Mehedi et al., "Reliability of NAND Flash Memory as a Weight Storage Device of Artificial Neural Network", IEEE Transactions on Device and Materials Reliability; vol. 20, Issue 3; Sep. 2020; 8 pages <https://ieeexplore.ieee.org/document/9149916>.

Resch, Salonik et al., "Pimball: Binary Neural Networks in Spintronic Memory", ACM Transactions on Architecture and Code Optimization; vol. 16, No. 4, Article 41; Oct. 2019; 26 pages <https://arxiv.org/pdf/1812.03989.pdf>.

Mizushina, Keita et al., "Layer-by-layer Adaptively Optimized ECC of NAND flash-based SSD Storing Convolutional Neural Network Weight for Scene Recognition", 2018 IEEE International Symposium on Circuits and Systems (ISCAS), May 27-30, 2018; 5 pages <https://ieeexplore.ieee.org/abstract/document/8351440>.

* cited by examiner

NON-VOLATILE MEMORY DIE WITH BIT-FLIP OBJECT INSERTION

FIELD

The disclosure relates, in some aspects, to memory devices such as non-volatile memory (NVM) arrays. More specifically, but not exclusively, the disclosure relates to injecting or inserting images of objects into other images stored within a die of an NVM array.

INTRODUCTION

Computer vision is a field of machine learning (ML) or artificial intelligence (AI) that involves deriving meaningful information from digital images, videos, etc., so that action can be taken based on that information. In some aspects, computer vision includes image recognition for use in identifying particular objects within images, e.g., objects that a self-driving vehicle might need to detect and identify while driving on a street or highway. Image recognition systems often need to be trained to recognize particular objects. Training can be facilitated by placing images of objects that need to be detected within other images, such as within background images. At least some aspects of the present disclosure are directed to improved methods and apparatus for inserting images of objects into other images.

In-memory computing relates to performing computations—such as the computations needed for computer vision processing—within memory devices rather than within separate processors. For example, computations may be performed on an NVM die that has NAND arrays that store the images to be processed. By performing computations in-memory, far less data may need to be transferred between the memory device and a separate processor. At least some aspects of the present disclosure are directed to providing in-memory methods and apparatus for inserting images of objects into other images, particularly in-memory systems that use latches on an NVM die to store and manipulate the images.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a device that includes: a non-volatile memory (NVM) array formed on a die and configured to store a first image; and processing circuitry formed on the die and configured to: obtain a second image corresponding to an object to be inserted into the first image; identify pixels within a target area of the first image for the object to be inserted; and insert the object into the first image by inverting at least one bit within each of the identified pixels of the first image.

Another embodiment of the disclosure provides a method for use with a device formed on a die having an NVM array. The method includes: obtaining a first image from the NVM; obtaining a second image corresponding to an object to be inserted into the first image; identifying pixels within a target area of the first image for the object to be inserted; and inserting the object into the first image by inverting at least one bit within each of the identified pixels of the first image.

Yet another embodiment of the disclosure provides an apparatus formed on a die that includes an NVM array. The apparatus includes: means for obtaining a first image from the NVM array; means for obtaining a second image corresponding to an object to be inserted into the first image; means for identifying pixels within the first image having locations within the first image that correspond to the object to be inserted; and means for inserting the object into the first image by inverting at least one bit within each of the identified pixels of the first image.

DETAILED DESCRIPTION

Figure 1:
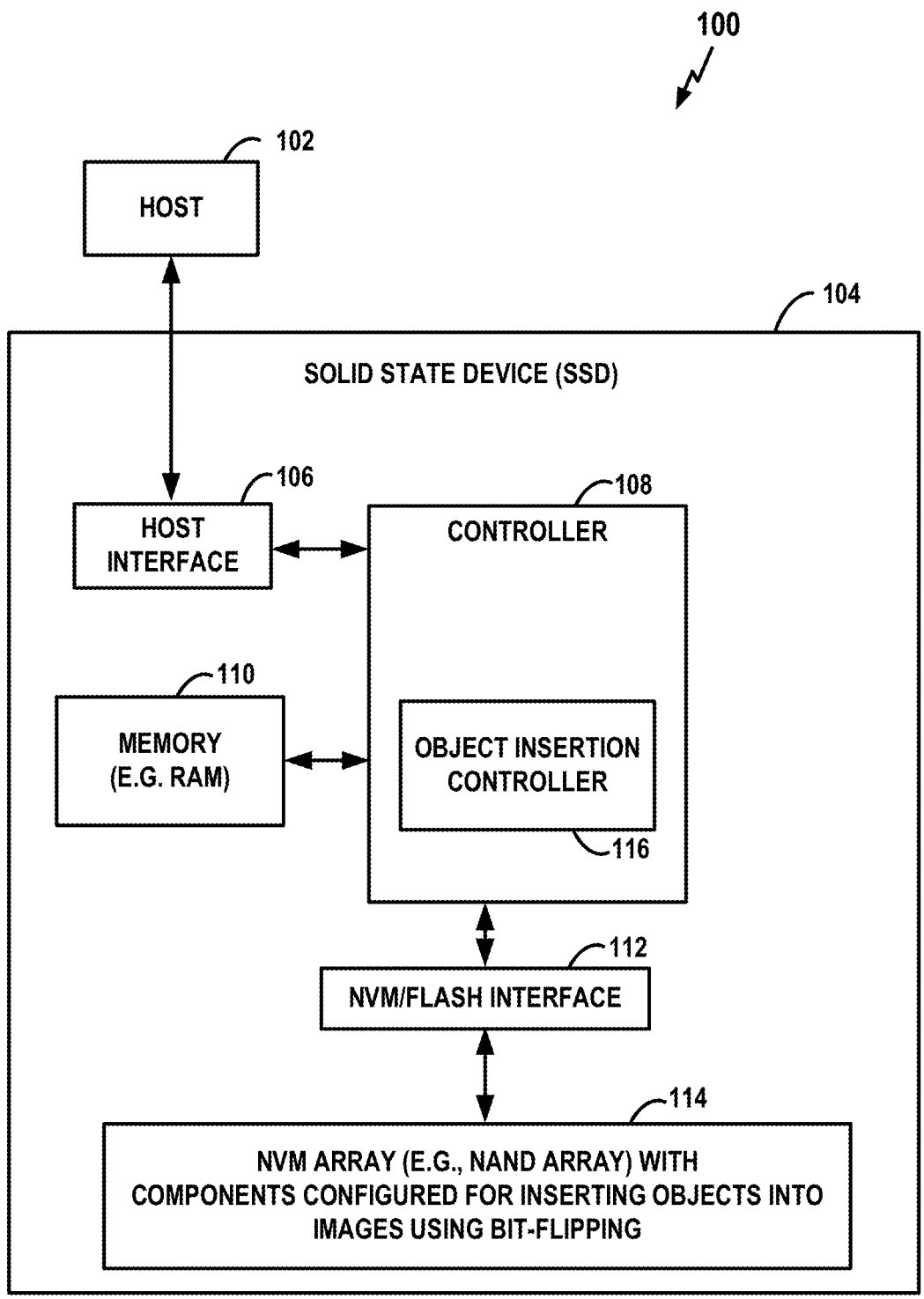
FIG. 1 is a schematic block diagram configuration for an exemplary solid state device (SSD) according to aspects of the present disclosure having one or more non-volatile memory (NVM) array dies, where the dies have components configured for inserting objects into images using bit-flipping.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (such as an SSD), and in particular to NAND flash memory storage devices (herein "NANDs"). (A NAND is a type of non-volatile storage technology that does not require power to retain data. It exploits negative-AND, i.e., NAND, logic.) For the sake of brevity, an SSD having one or more NAND dies will be used below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays, at least if such devices are equipped with suitable latches for implementing operations discussed herein. In addition to data storage devices, the NVM arrays and associated circuitry and latches in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components to such memory devices may be provided via one or more memory or system buses, including via interconnects such as Compute Express Link (CXL), Gen-Z, OpenCAPI, NVLink/NVSwitch, Infinity Fabric, Omni-Path and other similar interconnect protocols. In other embodiments, the links between processing components to memory devices may be provided via on-die or die-to-die interconnects. In certain embodiments the NVM arrays and associated circuitry and latches may be co-located on the same die as such processing components such as CPU or GPU.

Overview

As noted above, the training of computer visions systems can be facilitated by placing images of objects that need to be detected by the system within other images, such as within background images. Herein, in some aspects, a bit-flip object insertion technique is provided wherein an image of an object can be inserted into a location within a background image (or other suitable image) by flipping or inverting one or more bits within the pixels of the background image that correspond to the shape and location of object being inserted. In an illustrative example, pixels within the background image that correspond to the shape and insertion location of the object are XORed with all binary 1s. This flips the bits of those pixels to change the color (hue) and/or intensity (brightness) of the pixels so that the object then appears in the background image with the correct size, shape, and location. In other examples, only the most significant bit of the pixel in the background image is inverted (flipped).

The inserted object will not necessarily look exactly like the image it corresponds to. For example, the inserted object may not have the same color as its original image. Rather, the color of the inserted object will depend on the color of the pixels being inverted in the background image. The inserted object can, however, have the correct size and shape, which is often sufficient for the purposes of training a computer vision system to recognize various different objects, particularly image recognition systems that are edge-based, i.e., the system detects edges within an image to detect the boundary of an object from which its shape is determined. In one particular example, the image of a cat may be inserted into a background image by XORing (with all 1s) a group of pixels in the background image that collectively correspond to the shape of the cat. If the group of pixels of the background image originally had a dark hue (e.g., black), the inverted group of pixels will have a light hue (e.g., white) and so the cat will appear as a white cat amid a dark background. Conversely, if the group of pixels of the background image originally had a light hue (e.g., white), the inverted group of pixels will have a dark hue (e.g., black) and so the cat will appear as a dark cat amid a light background. In either case, a computer vision system can be trained using the image to detect the cat.

The procedure can be repeated to insert the same object into various different locations in the same background image to create an augmented set of different but related images for computer vision training. Likewise, the procedure can be repeated to insert the same object into different background images, or to insert different objects into the same background image, or various combinations thereof. This allows an augmented set of training images to be quickly and easily generated to facilitate computer vision training or for other applications.

Note that XORing pixels within the background image with all 1s to insert the object is a very quick and efficient technique that does not require replacing the pixels in the background image with pixels of the image to be inserted. Examples are described herein for use within an in-memory computing system on an NVM die that includes latches for processing and manipulating data read from NVM arrays. By using the on-die latches, the XOR operation can be performed at high-speed. Likewise, high-speed shift operations that may be used to select or align the particular pixels of a background image to be flipped.

Note that although the term "background image" is used herein to refer to a first image into which a second image is inserted, the first image need not be a background but can, in general, represent anything. Likewise, the second image need not be an object but can represent any suitable shape. In some cases, the second image might represent a background and the first image might represent an object, or both images might represent objects.

Thus, some features disclosed herein relate to inserting objects into images stored on an NVM using NVM latches. In some examples, additional processing circuitry is provided in the form of extra-array components of a NAND die to, e.g., implement computer vision or image recognition training using the modified images. Thus, in some examples, a high-performance computer vision training system is disclosed that includes flash NAND dies with on-chip image recognition systems with latch-based object insertion features that exploit bit-flipping. This keeps the data in the NAND and executes image recognition training operations without needing to use a separate processor (such as the processor of a data storage controller).

Although described primarily using examples where an NVM die is provided with on-chip circuitry to insert objects into images, many of the object insertion features and procedures described herein are also applicable to other devices or systems. For example, a data storage controller or a host computer may be configured to perform the object insertion using image data stored, for example, in a volatile memory.

Exemplary SSD Implementation with NVM Array Bit-Flip Object Insertion

FIG. 1 is a block diagram of a system 100 including an exemplary SSD having an NVM with bit-flip object image insertion components in accordance with aspects of the disclosure. The system 100 includes a host 102 and an SSD 104 coupled to the host 102. The host 102 provides commands to the SSD 104 for transferring data between the host 102 and the SSD 104. For example, the host 102 may provide a write command to the SSD 104 for writing data representing an image to the SSD 104 or read command to the SSD 104 for reading data from the SSD 104, such as a modified version of the image that has an object inserted into the image. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples. Additionally or alternatively, the host 102 may be a system or device having a need for image processing, such as computer vision for use in self-driving vehicles.

The SSD 104 includes a host interface 106, a controller 108, a memory 110 (such as a random access memory (RAM)), an NVM interface 112 (which may be referred to as a flash interface), and an NVM 114, such as one or more NAND dies. The NVM 114 may be configured with bit-flip objection insertion components. The host interface 106 is coupled to the controller 108 and facilitates communication between the host 102 and the controller 108. The controller 108 is coupled to the memory 110 as well as to the NVM 114 via the NVM interface 112. The host interface 106 may be any suitable communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

The controller 108 controls operation of the SSD 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any suitable memory, computing device, or system capable of storing data. For example, the memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory. The NVM 114 receives data from the controller 108 via the NVM interface 112 and stores the data. The NVM 114 may be any suitable type of non-volatile memory, such as a NAND-type flash memory or the like. In the example of FIG. 1, the controller 108 may include hardware, firmware, software, or any combinations thereof that provide an object insertion controller 116 for use with the NVM array 114, which may control, for example, what particular objects are to be inserted into an image. In this regard, although an NVM die may be configured to perform the actual object insertion using circuitry on the NVM die, to be described below, the controller 108 may be provided with a component for controlling the operation of the on-chip circuitry to, for example, specify what objects are to be inserted into various images and the particular insertion locations. Moreover, the controller 108 may be provided with object insertion circuitry or logic to insert objects into images for use, e.g., in cases where the NVM dies of the NVM array do not include on-chip object insertion circuitry.

Although FIG. 1 shows an example SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for deep learning that are described herein. The processor could, as one example, off-load certain tasks to the NVM and associated circuitry and/or components. As another example, the controller 108 may be a controller in another type of device and still include the object insertion controller 116 and perform some or all of the functions described herein.

Figure 2:
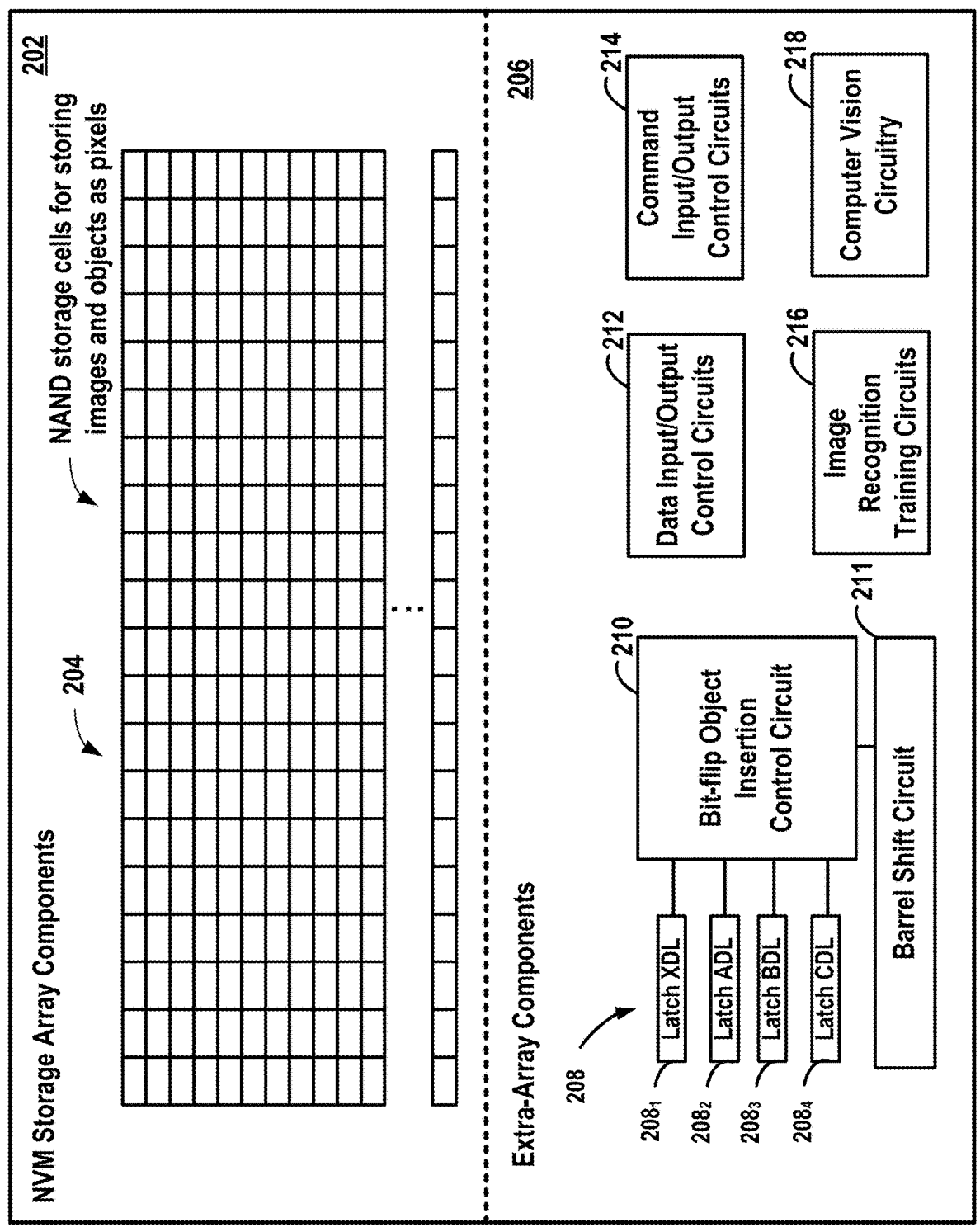
FIG. 2 illustrates an example of an NVM die having processing components configured for inserting objects into images using bit-flipping, according to aspects of the present disclosure.

FIG. 2 is a block diagram illustrating an exemplary NVM die 200 configured for performing bit-flip object insertion into images, such as within a device that also has an on-chip image recognition training components and computer vision components. NVM die 200 includes NVM storage array components 202 that include NAND storage cells 204 for storing images as pixels (and for storing other data), where the cells may be arranged in word lines, blocks, planes, or the like. NVM die 200 also includes extra-array processing components 206, which are referred to herein as "extra-array" because they are not part of the array of NAND storage cells 204. The extra-array components 206 may be configured, for example, as under-the-array or next-to-the array circuit components, and may include otherwise standard NAND die latches (e.g., XDL, ADL, BDL, CDL latches). Although not shown, the NVM die 200 may also include a separate sense latch (and potentially other data latches such as a DDL latch).

In the example of FIG. 2, the exemplary processing components 206 include: a set of latches 208, specifically $208_1$, $208_2$, $208_3$, and $208_4$, a bit-flip object insertion control circuit 210 for controlling the latches 208 to perform bit-flip object insertion (which may exploit a barrel shifting circuit 211), data input/output control circuits 212 for inputting data from the data storage controller (e.g., controller 108 of FIG. 1) and outputting data to the data storage controller; and command input/output control circuits 214 for inputting commands from the data storage controller, e.g., NVM read commands or write (program) commands and for outputting signals indicating completion of the commands (or error indicators if, for some reason, a particular command is not executed). The exemplary processing components 206 also include image recognition training circuits 216 for processing images into which objects have been inserted to train computer vision circuitry 218 to recognize those objects as part of an overall computer vision system (of which the die 200 may be just one component). Although not shown within FIG. 2, the control circuit 210 may include various OR circuits, AND circuits, etc., in addition to the barrel shifting circuit 211, for performing various latch-based operations using the latches 208. Not all circuit or memory components that might be used in a practical NVM die are illustrated in the figure, such as voltage regulation components, clocks and timing components, etc. Rather only some components and circuits are shown, summarized as blocks.

Exemplary Object Insertion Procedures

Figure 3:
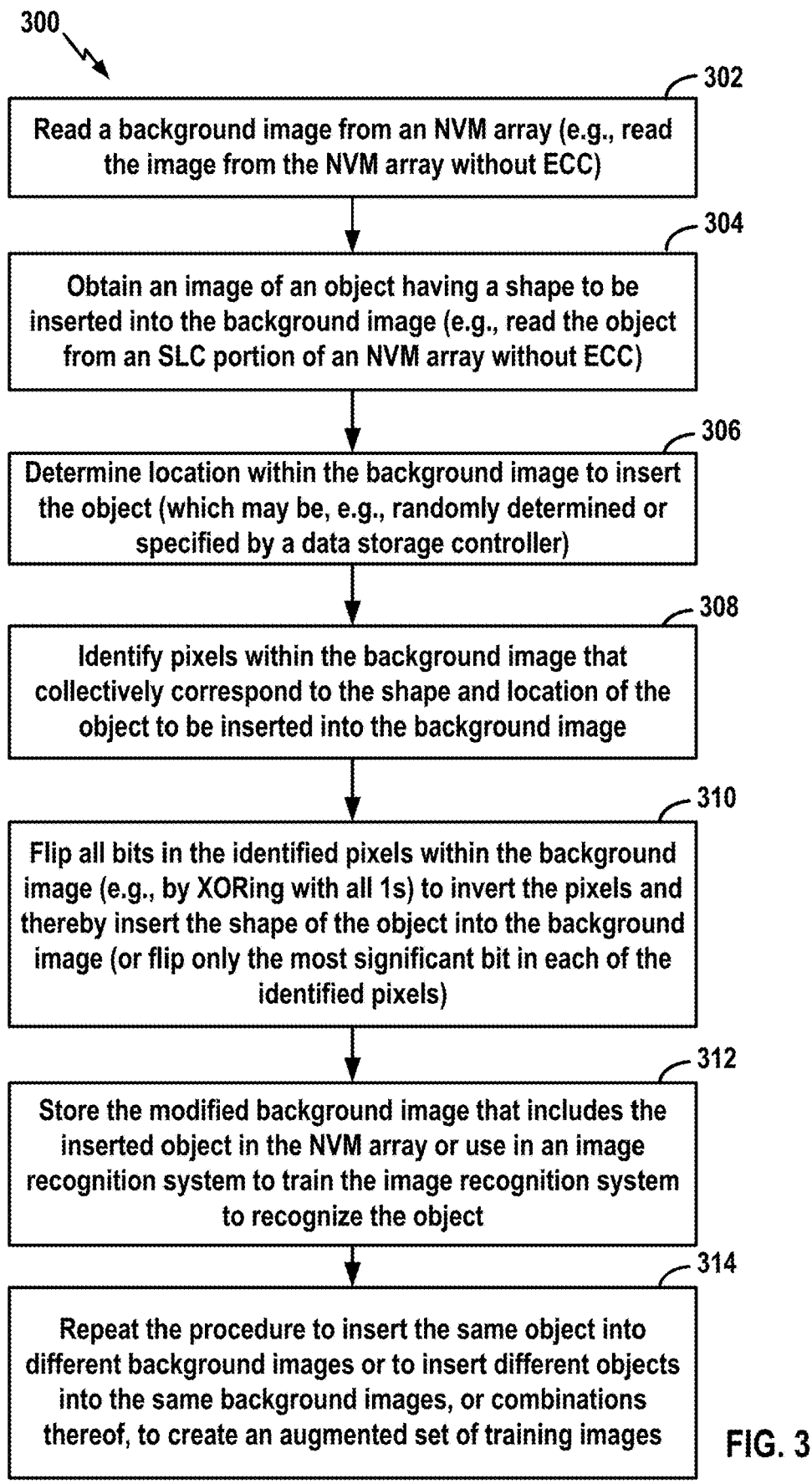
FIG. 3 is a flow chart of an exemplary method according to aspects of the present disclosure for inserting objects into images using bit-flipping.

FIG. 3 summarizes an illustrative procedure 300, which may be implemented by the bit-flip object insertion control circuit 210 and other components of the NVM die 200 of FIG. 2 using the latches 208 of FIG. 2 or other temporary memory registers. Beginning at block 302, the control circuit 210 or other suitable component reads a background (first) image from an NVM array, which is an image into which an object is to be inserted. In some examples, the image is read without error correction coding (ECC) to correct errors. In this regard, if the overall image insertion procedure is performed to generate an augmented image set for image recognition training, noise due to errors in the background image may be advantageous as the noise may tend to enhance the overall augmentation that is achieved. The background image may be read, e.g., into one or more of the latches (or, as will be explained below, chunks of the background image may be loaded iteratively into the latches).

At block 304, the control circuit 210 obtains a (second) image of an object having a shape to be inserted into the background (first) image. The second image may be obtained, e.g., from the data storage controller (e.g., controller 108 of FIG. 1) as part of a command instructing the control circuit 210 to insert the object into the background image or may be obtained from the NVM array itself, if already stored therein. In some examples, the object is read from the NVM array without ECC processing to correct errors. Again, if the overall image insertion procedure is performed to generate an augmented image set for image recognition training, noise due to errors in the object will not likely be an issue. If stored in the NVM array, the object may be stored in a single level cell (SLC) portion of the array to facilitate quick reads, though storage in multi-level cell (MLC) portions of the array is also feasible.

The object has a shape which is represented within the second image. For example, the second image may be a raster-based binary (black & white) image wherein the pixels (or bits) corresponding to the object (e.g., a cat) are represented by 1s, whereas the other pixels (or bits) are all 0s. The 1s thereby collectively represent the shape or silhouette of the object to be inserted (e.g., the cat). In other examples, the object in the second image may be a vector representation of the object. The second image may also be stored in one or more of the latches (or, as will be explained below, chunks of the second image may be iteratively loaded into the latches). In some examples, an object insertion command may be specified for use by the data storage controller to instruct the NVM to insert an object into an image stored in the NVM array, where the command specifies the image, the object, and the X,Y placement of the object into the image (and may further specify whether all bits of a pixel should be flipped or just the most significant bit).

At block 306, the control circuit 210 determines the location within the background image to insert the object (which may be, e.g., randomly determined or specified by the data storage controller, e.g., controller 108 of FIG. 1). For example, a command received from the data storage controller may specify the location within the background image for image insertion. In a further example, the command may specify a set of offsets within a binary string representing the entire background image (e.g., a bitmap of the image), where each offset indicates a starting location within the bit string for insertion of a corresponding portion of the object along with a bit length of that particular portion. In one example, each offset may represent the starting location (along an x-axis) for one horizontal line of pixels of the object and the length (along the x-axis) of that particular horizontal line, with the object collectively represented by a set of such horizontal lines of pixels (stacked vertically along a y-axis), with each horizontal line having a potentially different starting location (along the x-axis) and length (along the x-axis).

At block 308, the control circuit 210 identifies pixels (or bits) within the background image that collectively correspond to the shape and location of the object to be inserted into the background image (e.g., identify pixels within a target area of the first image for the object to be inserted). In an example where the background image is represented as a binary string (e.g., a bitmap of the image), and the location for insertion is specified by offsets/lengths within the string, the pixels (or bits) corresponding to the shape are the particular pixels (or bits) with the background image that overlap with the pixels (or bits) of the object based on the specified offsets/lengths. At block 310, the control circuit 210 flips all bits within the identified pixels of the background image (e.g., by XORing with all 1s) to invert the pixels and thereby insert the shape of the object into the background image. Alternatively, in some implementations, only the most significant bit within each of the identified pixels is flipped.

As explained above, by inverting the pixels in the background image that correspond to the object to be inserted, the object thereby appears within the background image by virtue of the inverted colors and/or inverted intensities. In a simple black & white example, white pixels within a predominantly white background image are inverted to black pixels so that an object (e.g., a cat) appears within the background image as a black cat. In a grayscale example, relatively light pixels (e.g., light gray) may be inverted to relatively dark pixels (e.g., dark gray) to thereby cause the object to appear within the background image. In a color example, pixels of one color may be inverted to a different color to thereby cause the object to appear within the background image. With a red/green/blue (RGB) additive color model scheme, blue pixels are inverted to orange pixels (or vice versa), and green pixels are inverted to magenta pixels (or vice versa), thus allowing the object to stand out in the background image. Note that other color schemes, e.g., subtractive color model schemes, can result in different specific color inversions, yet the inversion still results in the image being inserted by virtue of the inversion.

At block 312, the control circuit 210 stores the modified background image that includes the inserted object in the NVM array for later use or immediately uses the modified background image in an image recognition system to train the system to recognize the object. At block 314, the control circuit 210 repeats the procedure of blocks 302-312 to insert the same object into different background images or to insert different objects into the same background images, or combinations thereof, to create an augmented set of training images. Note that if ECC is deactivated and the image recognition system has difficulty detecting objects due to noise in the data read from the NVM, ECC may be reactivated. Additionally, any objects that are difficult to detect due to noise may be restored in a different (and less worn) part of the NVM array to reduce read errors or may be moved from MLC to SLC (if initially stored in MLC).

Figure 4:
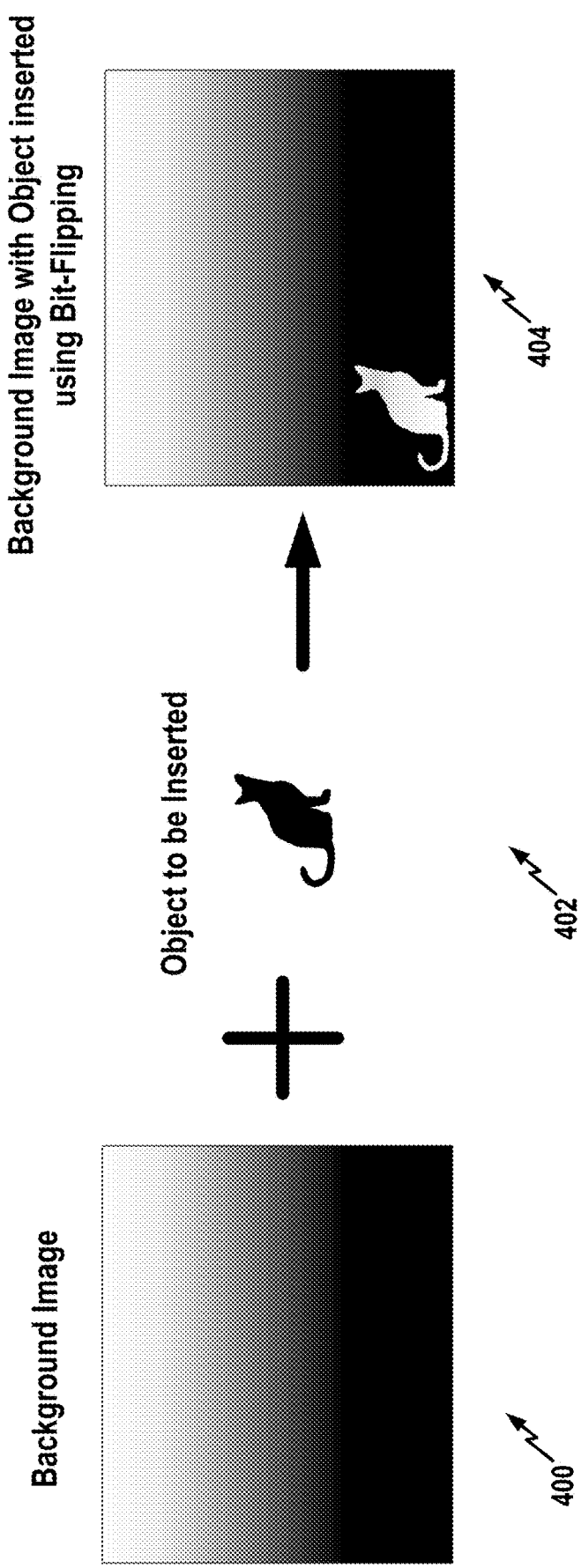
FIG. 4 illustrates a first example wherein an object is inserted into an image using bit-flipping according to aspects of the present disclosure.

FIG. 4 illustrates a first gray-scale example of object insertion by bit-flipping. In this example, a background image 400 has a gradient that changes from black (dark) at the bottom of the image to white (bright) at the top. The object 402 to be inserted is a small silhouette of a cat. The portions of the background image 400 that correspond to the shape of the cat 402 are inverted (bit flipped) to produce the final image 404 that includes the inserted image of the cat. In this example, because the image is inserted only into a small portion of the background image that is almost entirely dark, the resulting image of the cat is almost entirely light. The image of the cat that appears within the final image 404 nevertheless has a slight internal gradient, decreasing in brightness from bottom to top, which is the inverse of the slight gradient in the portion of the background image that was bit-flipped. Note that, if the cat were instead inserted into a top portion of the background image that is mostly white, the inserted cat would be almost entirely black. In either case, the shape of the cat is clearly visible and can be detected by an image recognition system.

Figure 5:
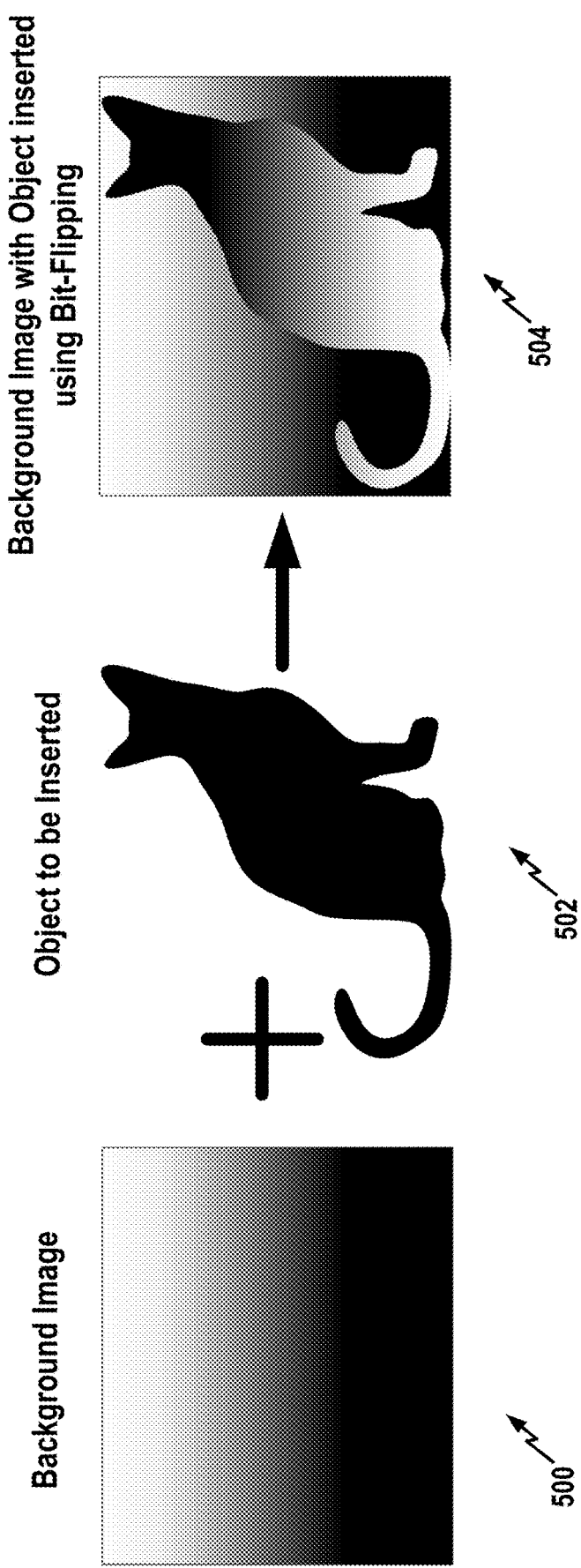
FIG. 5 illustrates a second example wherein an object is inserted into an image using bit-flipping according to aspects of the present disclosure.

FIG. 5 illustrates a second gray-scale example of object insertion by bit-flipping. In this example, a background image 500 again has a gradient that changes from black (dark) at the bottom of the image to white (bright) at the top. The object 502 to be inserted is again the silhouette of a cat, but in this example the silhouette is much larger and is inserted to fill much of the background image. As in the example of FIG. 4, the portions of the background image 500 that correspond to the shape of the cat 502 are inverted to produce the final image 504 that includes the inserted image of the cat. Note that the top-most portions of the cat in the final image 404 consist of bright portions of the background image 400 that have been inverted and hence now appear dark. The bottom-most portions of the cat in the final image 404 consist of dark portions of the background image that have been inverted and hence appear light. The image of the cat that appears within the final image 404 thereby exhibits a significant internal gradient that is the inverse of the gradient of the background image 400. Nevertheless, the image of the cat is still clearly visible and can be detected by an image recognition system.

In the illustrative examples of FIGS. 4 and 5, the background image is a simple grayscale gradient and hence does not have much detail but, generally speaking, the background image can be a much more complicated color photograph with texture and subtle detail, such as a color landscape photograph. Even with such a background photograph, by inverting those portions of the photograph that correspond to the object being inserted, dark portions of the background image become light and light portions become dark, while colors are also inverted, and so the object appears in the final image. There may be extreme or unusual cases of background images where an object, once inserted, is obscure and difficult to recognize, but those cases are likely rare and, if the image recognition system is unable to find any of various sample objects inserted into the background image, the image can be discarded. Likewise, if a particular object cannot be detected regardless of the background image it is inserted into, the object may be discarded. Insofar as gray scale applications are concerned, it is noted that a uniform gray background with middle gray pixels may be a poor choice for the background since flipping all the bits within middle gray pixels may not significantly change the shade of those pixels. When using such a gray background, an implementation that instead flips only the most significant bit may be preferred. For a 24-bit pixel example, flipping the most significant bit will cause, on the average, a 50% traversal across the image space, thus yielding a detectable object within the background image.

Generally speaking, the bit-flipping procedures described herein are well-suited for use with objects that have distinct shapes for detection by image recognition systems that identify and distinguish objects based on their shapes (e.g., to distinguish dogs from cats). For example, the image recognition system may locate the edge or boundary of an object in an image, determine the shape from the boundary, and then identify the object based on the shape. The bit-flipping procedures described herein may be less well-suited for use with image recognition systems that identify an image based on its internal patterns (e.g., to distinguish one breed of cat from another based on fur patterns and colors).

Figure 6:
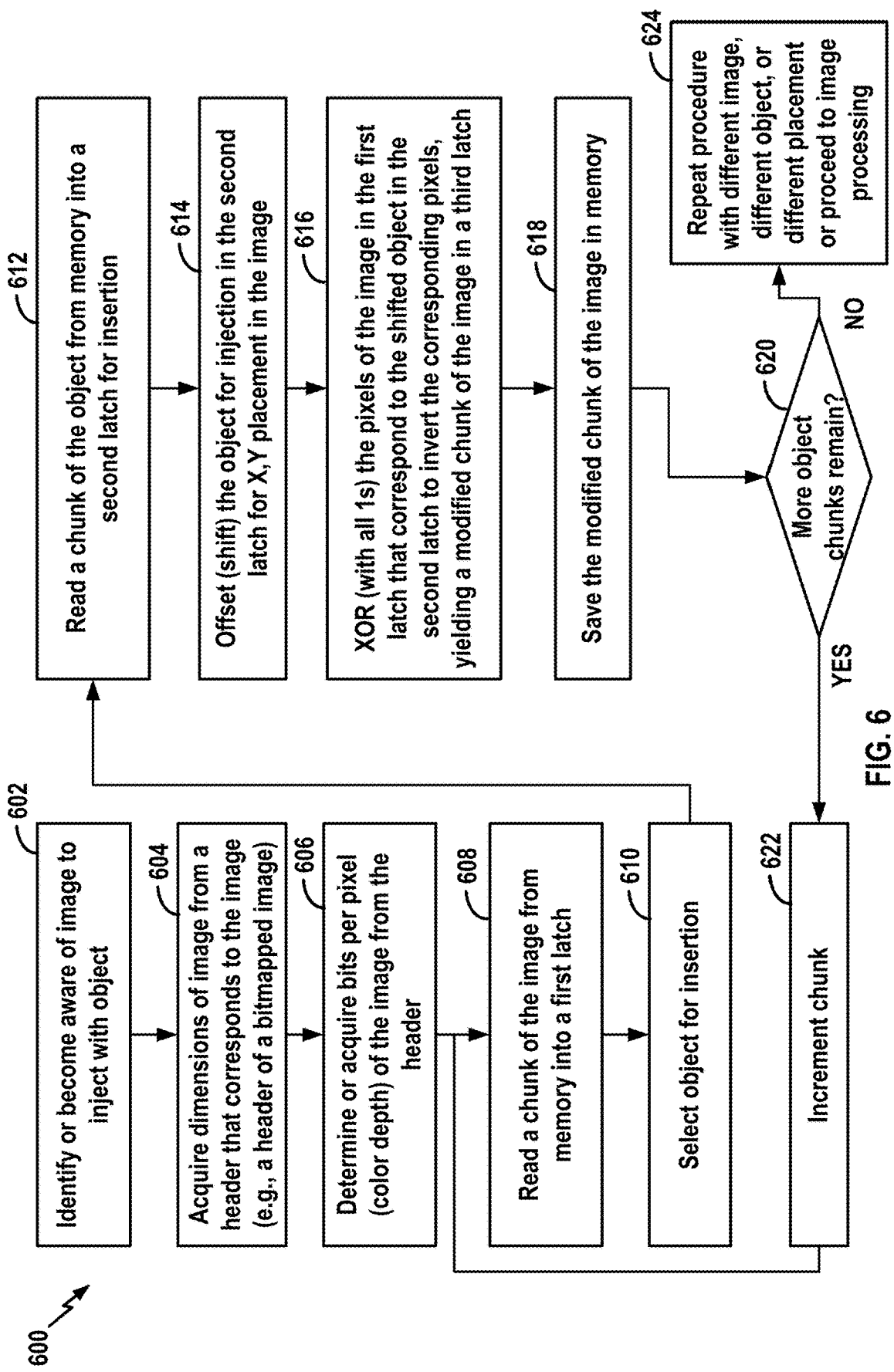
FIG. 6 is a flow chart of another exemplary method according to aspects of the present disclosure for inserting objects into images using bit-flipping.

FIG. 6 summarizes another illustrative procedure 600, which may be implemented by the bit-flip object insertion control circuit 210 and other components of the NVM die 200 of FIG. 2 using the latches 208 of FIG. 2 or other temporary memory registers. Beginning at block 602, the control circuit 210 or other suitable processing component identifies or otherwise becomes aware of an image to inject with an object. For example, the control circuit 210 may randomly select an image from a database of images stored in the NVM array. In other examples, the data storage controller may select a particular image and send suitable commands to the NVM die to identify the image. At block 604, the control circuit 210 acquires the dimensions of the image from a header that corresponds to the image and is stored along with the image (such as a header of a bitmapped image). At block 606, the control circuit 210 determines or otherwise acquires the bits per pixel (i.e., the color depth) of the image from the header. At block 608, the control circuit 210 reads a "chunk" of the image from memory into a first latch, such as the XDL latch. The chunk may be any suitable portion of the image that the latch can accommodate. For an example where the image is a bitmapped image consisting of a set of N horizontal lines of pixels, each of which is M pixels long (so that the image is an N×M pixel image), the chunk may consist of one line (i.e., M pixels) of the image. Note that NVM die latches are often 16 Kilobytes in size (e.g., one NAND page size) and so, depending upon the size of image, one image chunk may include multiple lines of an image and, in some cases, might include the entire image.

At block 610, the control circuit 210 selects an object for insertion. For example, the NVM die may store a database or library of standard objects (e.g., cats, dogs, cars, etc.) for insertion into images and randomly selects one of the objects (or selects a next object among a series of objects to be processed). In some aspects, selecting on object for insertion may be done while factoring in the bits per pixel. For example, the database may store different versions of the same object for use with different background images depending upon the bits per pixel of the background image (i.e., the color depth). At block 612, the control circuit 210 reads a chunk of the object from memory into a second latch for insertion. In a bitmapped example, the chunk of the object may consist of one line (i.e., M pixels) of the object. The bits corresponding to the pixels of the object may be represented by 1s, whereas other bits are 0s.

At block 614, the control circuit 210 offsets (shifts) the object for injection in the second latch for X,Y placement into the image. For example, if the particular portion of the object represented by the current object chunk is meant to be placed into the middle of the image (along the x-axis), the bits in the second latch are right-shifted at block 614 so as to place the 1s that represent the object in the middle of the second latch so they align with image bits in the middle of the first latch. Shifting may be performed using a barrel-shifter, if the device is so equipped. Insofar as placement along the y-axis is concerned, if the latches store more than one line of an image (i.e., an image chunk consists of two or more horizontal lines of the image), then the bits of the object chunk can be shifted up (along the y-axis) to align with the next horizontal line of the image by shifting the object chunk far enough along the second latch until it aligns with the correct y-axis portion of the image stored in the first latch. For an example where each image chunk and each object chunk instead represent just one horizontal line of an image, y-axis placement is not controlled through shifting at block 614 (which, in that example, would control only x-axis placement). Rather, placement along the y-axis would be controlled by incrementing the chunk until an image chunk is read that has the correct y-axis location for correct placement of a portion of the object chunk. Note that the determination of the particular X,Y location to be used at block 614 for the insertion of an object may be specified by the data storage controller or other suitable components, e.g., as part of an image recognition training procedure that also selects the particular images and the particular objects. In other examples, the control circuit 210 may select a location at random for object insertion.

At block 616, the control circuit 210 XORs (with all 1s) the pixels of the image in the first latch that correspond to the shifted object in the second latch to invert the corresponding or overlapping pixels, yielding a modified chunk of the image in a third latch. For the example where the object is represented by a series of is in the second latch (and the bits of the second latch that do not correspond to the object are all 0s), the control circuit 210 simply XORs the first latch with the second latch and stores the results in a third latch. This flips the bits of the first latch that correspond to the location of the object to thereby invert those pixels. Other pixels of the image are unaffected. The third latch receives the results of that XOR operation. In other examples, as noted, only the most significant bits of the pixels of the image in the first latch that correspond to the shifted object in the second latch are flipped.

At block 618, the control circuit 210 saves the modified chunk of the image in memory, such as in the NVM array. In other examples, the data storage controller may read the modified image directly out of the latch (such as for use within NANDs that have multiple planes, each of which has its own latches). At block 620, the control circuit 210 determines whether more object chunks remain for processing. If so, the chunk is incremented at block 622 and processing returns to block 608 for reading a next chunk of the image and then a next chunk of the object (at block 612). Once all chunks of the object have been processed, so that all corresponding portions of the image have been inverted, then, at block 624, the control circuit 210 may repeat the procedure with a different image, a different object, or a different placement of location of the object in the image, or proceed to image processing to, e.g., train an image recognition system to recognize the inserted object.

What have been described thus far are examples where one or more bits in certain pixels in the background image are inverted (flipped) to insert an object into the background image. In other embodiments, the object can be inserted into the background image by replacing particular pixels in the background image with the corresponding pixel of the object. For example, the pixels in the background image to be replaced may be first ANDed with 0s, and then ORed with the values in the corresponding pixels of the object. This will force the bits in the pixels in the background image to be the same value as the bits in the corresponding pixels of the object. Referring again to FIG. 6, this may be achieved by performing the operations of blocks 612-616 twice, once for the AND, and once for the OR. As another alternative, the object can be inserted into the background image by forcing the particular pixels in the background image that correspond to pixel of the object to all 1s or all 0s. For a grayscale example, the result in an object that is either all black or all white. For a color example, the results in an object that is either all a first particular color (i.e., the color defined by all 1s within a pixel) or all a second particular color (i.e., the color defined by all 0s within a pixel). This may be achieved by modifying block 616 of FIG. 6 to force the image pixels to all 1s or all 0s (depending upon the pre-programming of the system).

In the following, various general exemplary procedures and systems are described.

Exemplary Data Storage Device Die

Figure 7:
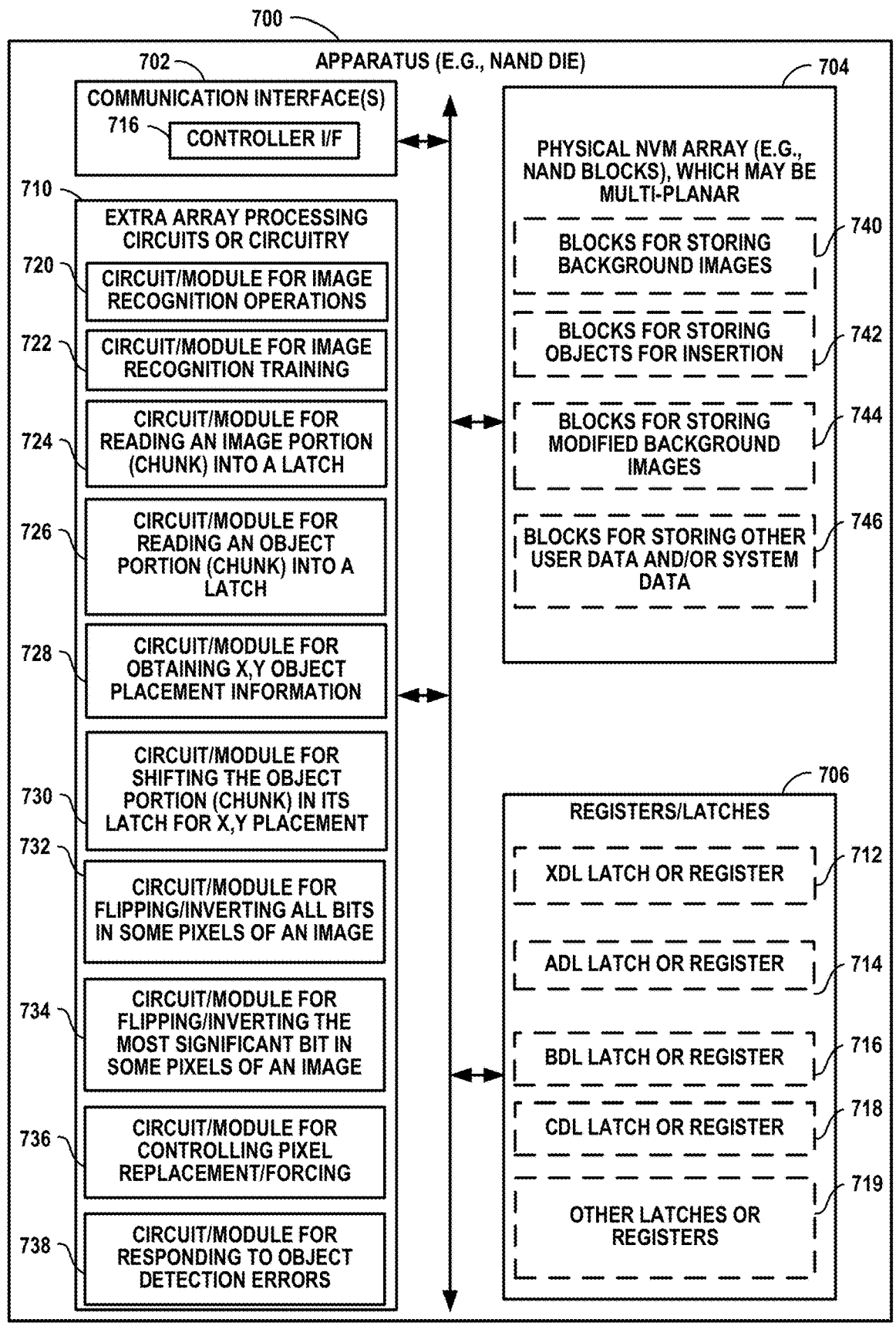
FIG. 7 is a schematic block diagram configuration for an exemplary NVM apparatus such as a NAND die having circuits for inserting objects into images using bit-flipping, according to aspects of the present disclosure.

FIG. 7 illustrates an embodiment of an apparatus 700 configured according to one or more aspects of the disclosure. The apparatus 700, or components thereof, could embody or be implemented within a NAND die or some other type of NVM device that supports data storage. In various implementations, the apparatus 700, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes or uses image data. (In some aspects, the apparatus is instead a volatile memory chip with a volatile memory data storage array.)

The apparatus 700 includes a communication interface 702, a physical memory array (e.g., NAND blocks) 704, a set of registers and/or latches 706, and extra-array processing circuits or circuitry 710 (e.g., circuitry formed on the same die that includes the NVM array). The NVM array 704 may be a multi-planar array. These components can be coupled to and/or placed in electrical communication with one another via suitable components, represented generally by the connection lines in FIG. 7. Although not shown, other circuits such as timing sources, peripherals, voltage regulators, and power management circuits may be provided, which are well known in the art, and therefore, will not be described any further.

The communication interface 702 provides a means for communicating with other apparatuses over a transmission medium. In some implementations, the communication interface 702 includes circuitry and/or programming (e.g., a program) adapted to facilitate the communication of information bi-directionally with respect to one or more devices in a system. In some implementations, the communication interface 702 may be configured for wire-based communication. For example, the communication interface 702 could be a bus interface, a send/receive interface, or some other type of signal interface including circuitry for outputting and/or obtaining signals (e.g., outputting signal from and/or receiving signals into an SSD). The communication interface 702 serves as one example of a means for receiving and/or a means for transmitting.

The physical memory array 704 may represent one or more NAND blocks. The physical memory array 704 may be used for storing data such as background images and image objects that are manipulated by the processing circuits 710 or some other component of the apparatus 700. The physical memory array 704 may be coupled to the processing circuits 710 (via, e.g., registers/latches 706) such that the processing circuits 710 can read or sense information from, and write or program information to, the physical memory array 704 (via, e.g., registers/latches 706). That is, the physical memory array 704 can be coupled to the processing circuits 710 so that the physical memory array 704 is accessible by the processing circuits 710. The registers/latches 706 may include one or more of: an XDL latch 712; an ADL latch 714; a BDL latch 716; a CDL latch 718, and one or more other latches or registers 719, such as a sensing latch.

The processing circuits 710 are arranged or configured to obtain, process and/or send data, control data access and storage, issue or respond to commands, and control other desired operations. For example, the processing circuits 710 may be implemented as one or more processors, one or more controllers, and/or other structures configured to perform functions.

According to one or more aspects of the disclosure, the processing circuits 710 may be adapted to perform any or all of the features, processes, functions, operations and/or routines described herein. For example, the processing circuits 710 may be configured to perform any of the steps, functions, and/or processes described with respect to FIGS. 3, 6, and 9-12 (described below). As used herein, the term "adapted" in relation to the processing circuit 710 may refer to the processing circuits 710 being one or more of configured, employed, implemented, and/or programmed to perform a particular process, function, operation and/or routine according to various features described herein. The processing circuits 710 may include a specialized processor, such as an application specific integrated circuit (ASIC) that serves as a means for (e.g., structure for) carrying out any one of the operations described in conjunction with FIGS. 3, 6, and 9-12. The processing circuits 710 serves as one example of a means for processing. In various implementations, the processing circuits 710 may provide and/or incorporate, at least in part, the functionality described above for the processing components of FIG. 2.

According to at least one example of the apparatus 700, the processing circuitry 710 may include one or more of: a circuit/module 720 configured for performing image recognition (or computer vision) operations, such as processing images received by apparatus 700 to detect objects therein; a circuit/module 722 configured for performing image recognition training (or computer vision training) operations, such as processing images stored by apparatus 700 to train circuit/module 720 to detect objects within the images; a circuit/module 724 configured for reading an image portion (chunk) into a latch, such as reading a portion of a background image obtained from NVM array 704 into XDL latch 712; a circuit/module 726 configured for reading an object portion (chunk) into a latch, such as reading a portion of an object image obtained from NVM array 704 into ADL latch 714; a circuit/module 728 configured for obtaining X,Y object placement information, such as information provided by a data storage controller specifying the particular location within an image (or portion thereof) for insertion of an object (or portion thereof); a circuit/module 730 configured for shifting the object portion (chunk) in its latch for X,Y placement, such as for shifting the bits within ADL latch 714 (that contains the object to align) with certain bits within XDL latch 712 (that contains the image to insert the object into); a circuit/module 732 configured for flipping/inverting all bits in some pixels of image, such as by XORing the bits in the XDL latch 712 (that contain the portions of the image into which an object is to be inserted) with the bits in the ADL latch 714 (that correspond to the object to be inserted); a circuit/module 734 configured for flipping/inverting the most significant bit in some pixels of an image, such as by XORing the most significant bit of each pixel in the XDL latch 712 (that contain the portions of the image into which an object is to be inserted) with the most significant bit of the corresponding pixel in the ADL latch 714 (that corresponds to the object to be inserted); a circuit/module 736 configured for controlling pixel replacement, such as by replacing each pixel in the XDL latch 712 (that contains the portions of the image into which an object is to be inserted) with the corresponding pixel in the ADL latch 714 (that corresponds to the object to be inserted) or controlling pixel forcing, such as by overwriting each pixel in the XDL latch 712 (that contains the portions of the image into which an object is to be inserted) with all 1s or all 0s; and a circuit/module 738 configured for responding to object detection errors (as detected, e.g., by circuit/module 720) such as by activating ECC, moving data from MLC to SLC, or re-storing data in different (non-worn) blocks of the NVM array 704.

In at least some examples, means may be provided for performing the functions illustrated in FIG. 7 and/or other functions illustrated or described herein. For example, the means may include one or more of: means, such as circuit/module 720, for performing image recognition (or computer vision) operations, such as means for processing images received by apparatus 700 to detect objects therein; means, such as circuit/module 722, for performing image recognition training (or computer vision training) operations, such as means for processing images stored by apparatus 700 to train circuit/module 720 to detect objects within the images; means, such as circuit/module 724, for reading an image portion (chunk) into a latch, such as means for reading a portion of a background image obtained from NVM array 704 into XDL latch 712; means, such as circuit/module 726, for reading an object portion (chunk) into a latch, such as means for reading a portion of an object image obtained from NVM array 704 into ADL latch 714; means, such as circuit/module 728, for obtaining X,Y object placement information, such as information provided by a data storage controller specifying the particular location within an image (or portion thereof) for insertion of an object (or portion thereof); means, such as circuit/module 730, for shifting the object portion (chunk) in its latch for X,Y placement, such as means for shifting the bits within ADL latch 714 (that contains the object to align) with certain bits within XDL latch 712 (that contains the image to insert the object into); means, such as circuit/module 732, for flipping/inverting all bits in some pixels of image, such as means for XORing the bits in the XDL latch 712 (that contain the portions of the image into which an object is to be inserted) with the bits in the ADL latch 714 (that correspond to the object to be inserted); means, such as circuit/module 734, for flipping/inverting the most significant bit in some pixels of an image, such as means for XORing the most significant bit of each pixel in the XDL latch 712 (that contain the portions of the image into which an object is to be inserted) with the most significant bit of the corresponding pixel in the ADL latch 714 (that corresponds to the object to be inserted); means, such as circuit/module 736, for controlling pixel replacement/forcing, such as means for replacing each pixel in the XDL latch 712 (that contains the portions of the image into which an object is to be inserted) with the corresponding pixel in the ADL latch 714 (that corresponds to the object to be inserted) and/or means for overwriting each pixel in the XDL latch 712 (that contains the portions of the image into which an object is to be inserted) with all 1s or all 0s; and means, such as circuit/module 738, for responding to object detection errors (as detected, e.g., by circuit/module 720) such as means for activating ECC, means for moving data from MLC to SLC, or means for re-storing data in different (non-worn) blocks of the NVM array 704.

In some aspects, an apparatus is provided that includes: means (such as circuit/module 724) for obtaining a first image from the NVM; means (such as circuit/module 726) for obtaining a second image corresponding to an object to be inserted into the first image; means (such as circuit/module 728) for identifying pixels within the first image having locations within the first image that correspond to the object to be inserted (or identifying pixels within a target area of the first image for the object to be inserted); and means (such as circuit/module 732) for inserting the object into the first image by flipping at least one bit within each of the identified pixels of the first image.

Additional Exemplary Methods and Embodiments

Figure 8:
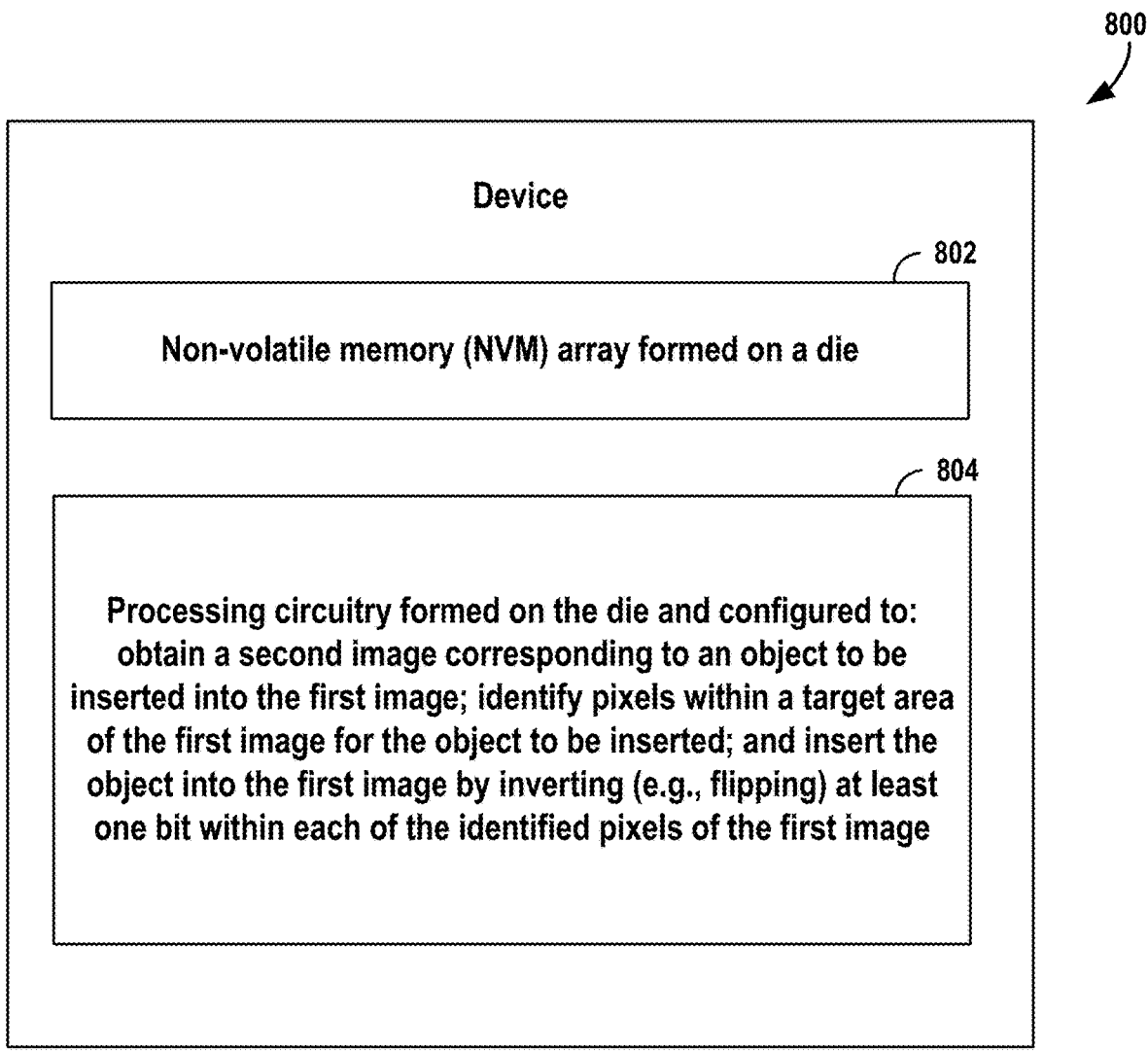
FIG. 8 is block diagram illustrating an exemplary device according to aspects of the present disclosure having components for inserting an object into an image.

FIG. 8 is a block diagram of an exemplary device 800 in accordance with some aspects of the disclosure. The device 800 (which may be a data storage device) includes: an NVM array 802 formed on a die and configured to store a first image; and a processing circuit or processing circuitry 804 formed on the die and configured to: obtain a second image corresponding to an object to be inserted into the first image; identify pixels within a target area of the first image for the object to be inserted (e.g., identify pixels within the first image having locations within the first image that correspond to the object to be inserted); and insert the object into the first image by inverting (e.g., flipping) at least one bit within each of the identified pixels of the first image. See, for example, the devices of FIGS. 2 and 7, described above.

Figure 9:
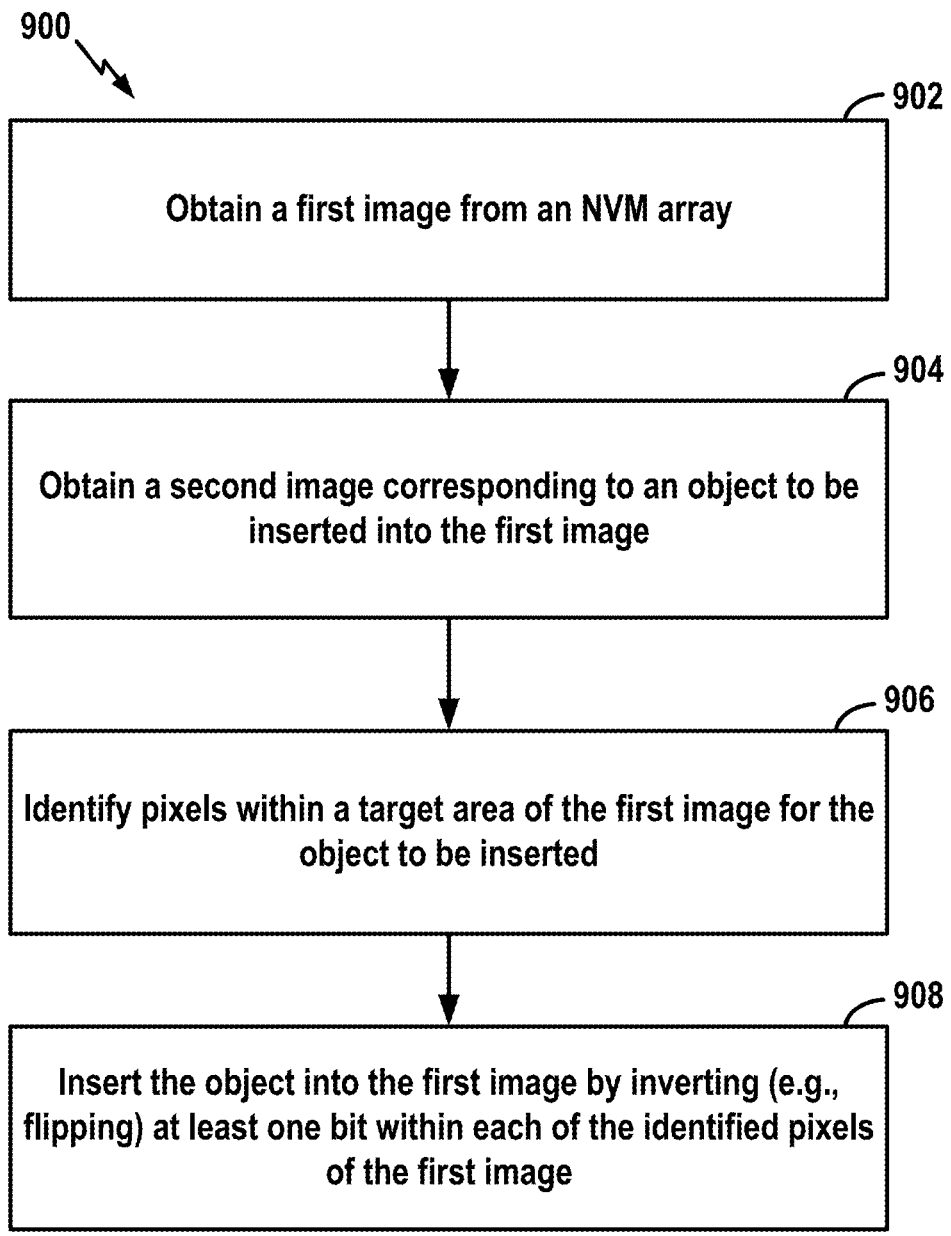
FIG. 9 is a flow chart of an exemplary method according to aspects of the present disclosure for inserting an object into an image.

FIG. 9 illustrates an exemplary method or process 900 in accordance with some aspects of the disclosure. The process 900 may take place within any suitable device (which may be a data storage device) or apparatus capable of performing the operations, such as a NAND die configured with appropriate processing circuitry. See, for example, the devices of FIGS. 2 and 7, described above. At block 902, the device obtains a first image from an NVM array of the die, which may be stored in a first latch of a set of latches as a bitmapped image. At block 904, the device obtains a second image corresponding to an object to be inserted into the first image. The second image may be stored in a second latch of the set of latches as another bitmapped image with the bits corresponding to the object set to 1s and all other bits set to 0s. At block 906, the device identifies pixels within a target area of the first image for the object to be inserted. For example, the device identifies pixels within the first image having locations within the first image that correspond to the shape and location of the object to be inserted. This may include obtaining X,Y location information specifying a location in the first image where the object is to be inserted and then shifting bits within the first and second latches relative to one another to align certain bits of the bitmapped representation of the object in the second latch with certain bits of the bitmapped representation of the first image in the first latch, as described above. At block 908, the device inserts the object into the first image by flipping or inverting at least one bit within each of the identified pixels of the first image. This may include XORing the first and second latches to XOR the 1's representative of the object with the bits of the corresponding pixels of the first image into which the object is to be inserted, as described above. See, for example, the method of FIG. 6, described above.

Figure 10:
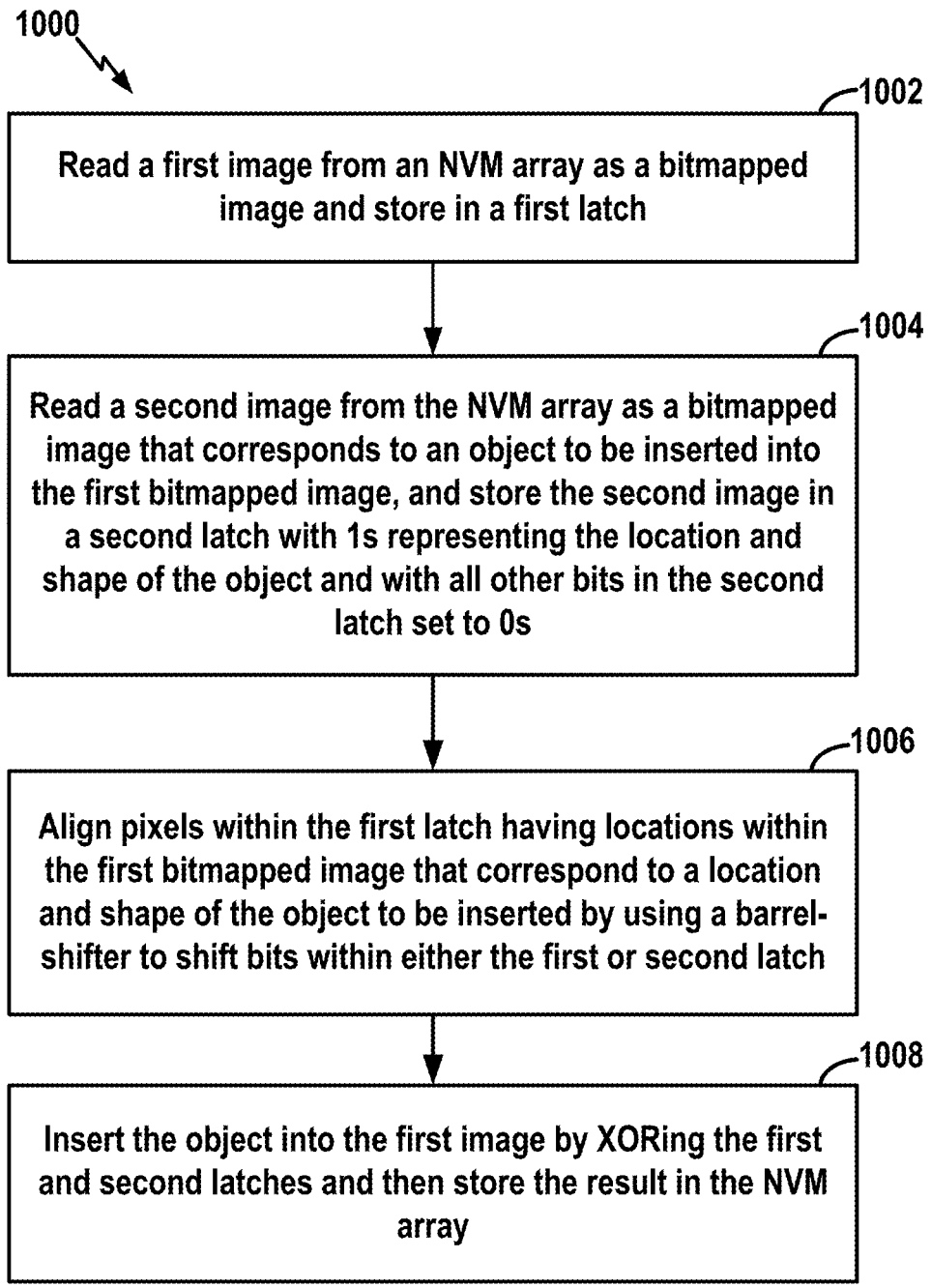
FIG. 10 is a flow chart of another exemplary method according to aspects of the present disclosure for inserting an object into an image.

FIG. 10 illustrates another exemplary method or process 1000 in accordance with some aspects of the disclosure. The process 1000 may take place within any suitable device (which may be a data storage device) or apparatus capable of performing the operations, such as a NAND die configured with appropriate processing circuitry, including at least two latches. See, for example, the devices of FIGS. 2 and 7, described above. At block 1002, the device reads or loads a first image from an NVM array as a bitmapped image and store in a first latch, such as an XDL latch. At block 1004, the device reads or loads a second image from the NVM array as a bitmapped image that corresponds to (the shape of) an object to be inserted into the first bitmapped image, and stores the second image in a second latch (such as an ADL latch) with 1s representing the location and shape of the object and all other bits set to 0s. At block 1006, the device aligns pixels within the first latch having locations within the first bitmapped image that correspond to a location and shape of the object to be inserted by using a barrel-shifter to shift bits within either the first or second latch. This may include obtaining X,Y location information specifying a location in the first image where the object is to be inserted and then shifting bits within the first and second latches relative to one another to align certain bits of the bitmapped representation of the object in the second latch with certain bits of the bitmapped representation of the first image in the first latch, as described above. At block 1008, the device inserting the object into the first image by XORing the first and second latches and then store the result in the NVM array. See, for example, the method of FIG. 10, described above.

Figure 11:
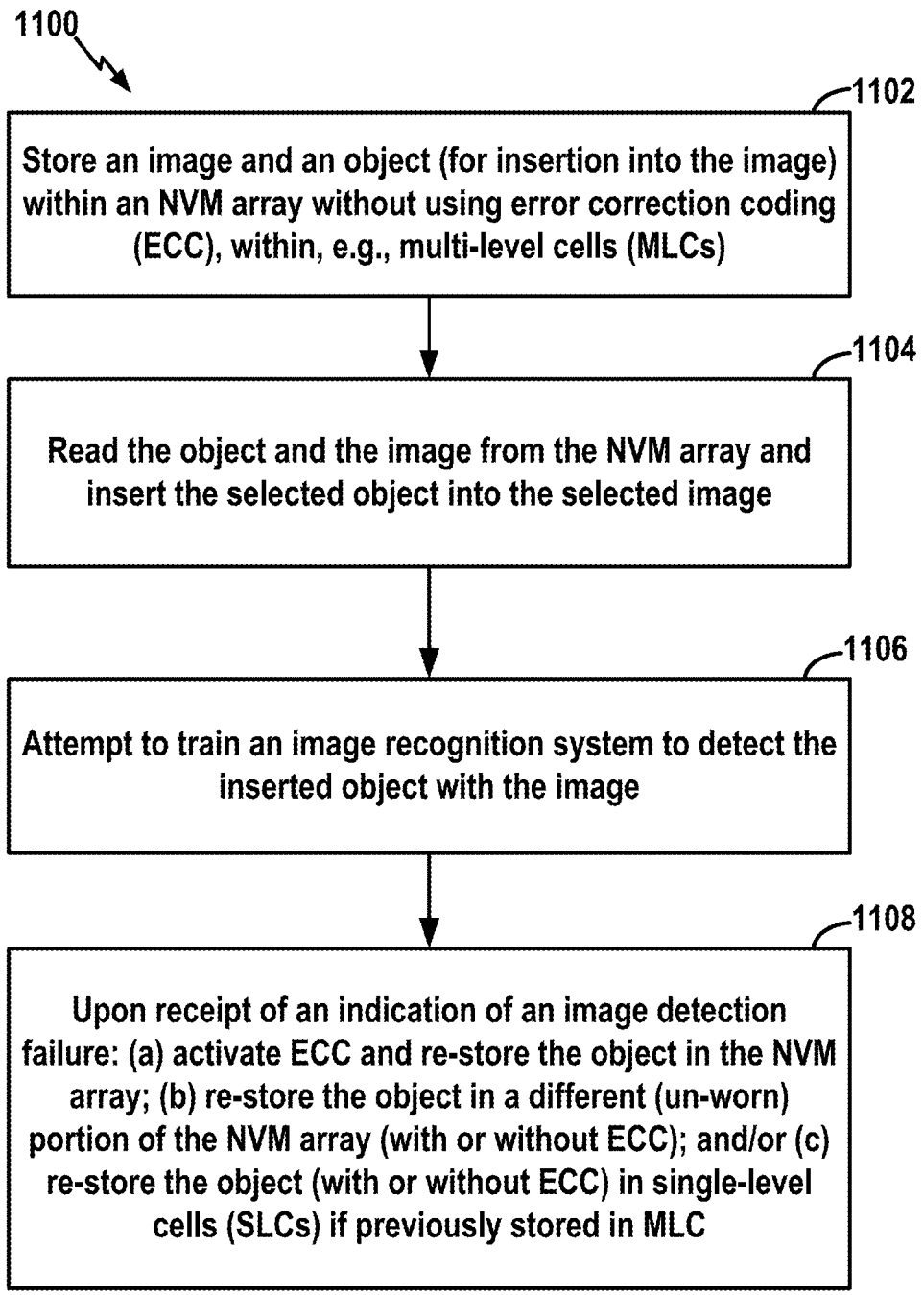
FIG. 11 is a flow chart of yet another exemplary method according to aspects of the present disclosure for inserting an object into an image.

FIG. 11 illustrates another exemplary method or process 1100 in accordance with some aspects of the disclosure. The process 1100 may take place within any suitable device (which may be a data storage device) or apparatus capable of performing the operations, such as a NAND die configured with appropriate processing circuitry. See, for example, the devices of FIGS. 2 and 7, described above. At block 1102, the device stores an image and an object (for insertion into the image) in an NVM array without using ECC. The image or the object, or both, might be stored in MLC. At block 1104, the device reads the object and the image from the NVM array and inserts the selected object into the selected image (using, for example, the procedures described above). At block 1106, the device attempts to train an image recognition system to detect the inserted object with the image. This may include using on-chip image recognition processing circuitry or may involve sending the image with the inserted object to an off-chip data storage controller or a host processor. If the image recognition processing circuitry or system is unable to detect the object, perhaps because there is too much noise in the image due to the lack of ECC, the image recognition processing circuitry or system provides an indication of that failure. Upon receipt of an indication of an image detection failure (i.e., failed detection), the device at block 1108: (a) activates ECC and re-stores the object in the NVM array with ECC; (b) re-stores the object in a different (un-worn) portion of the NVM array (with or without ECC); and/or (c) re-stores the object (with or without ECC) in single-level cells (SLCs) if previously stored in MLC. Thus, if the failure to detect the object in the image was (a) due to noise or other errors from a lack of ECC, (b) because the portion of the NVM array in which the object was stored in had become too worn, or (c) because MLC was used to store the data, the problem might be remedied or mitigated at block 1106. Additionally, the device may also re-store the image itself (and not just the object). Note that if, despite performing the re-storage operations of block 1106, the image recognition system is still unable to detect the inserted object, other procedures may be performed, such as by choosing a different object or a different object insertion location.

Figure 12:
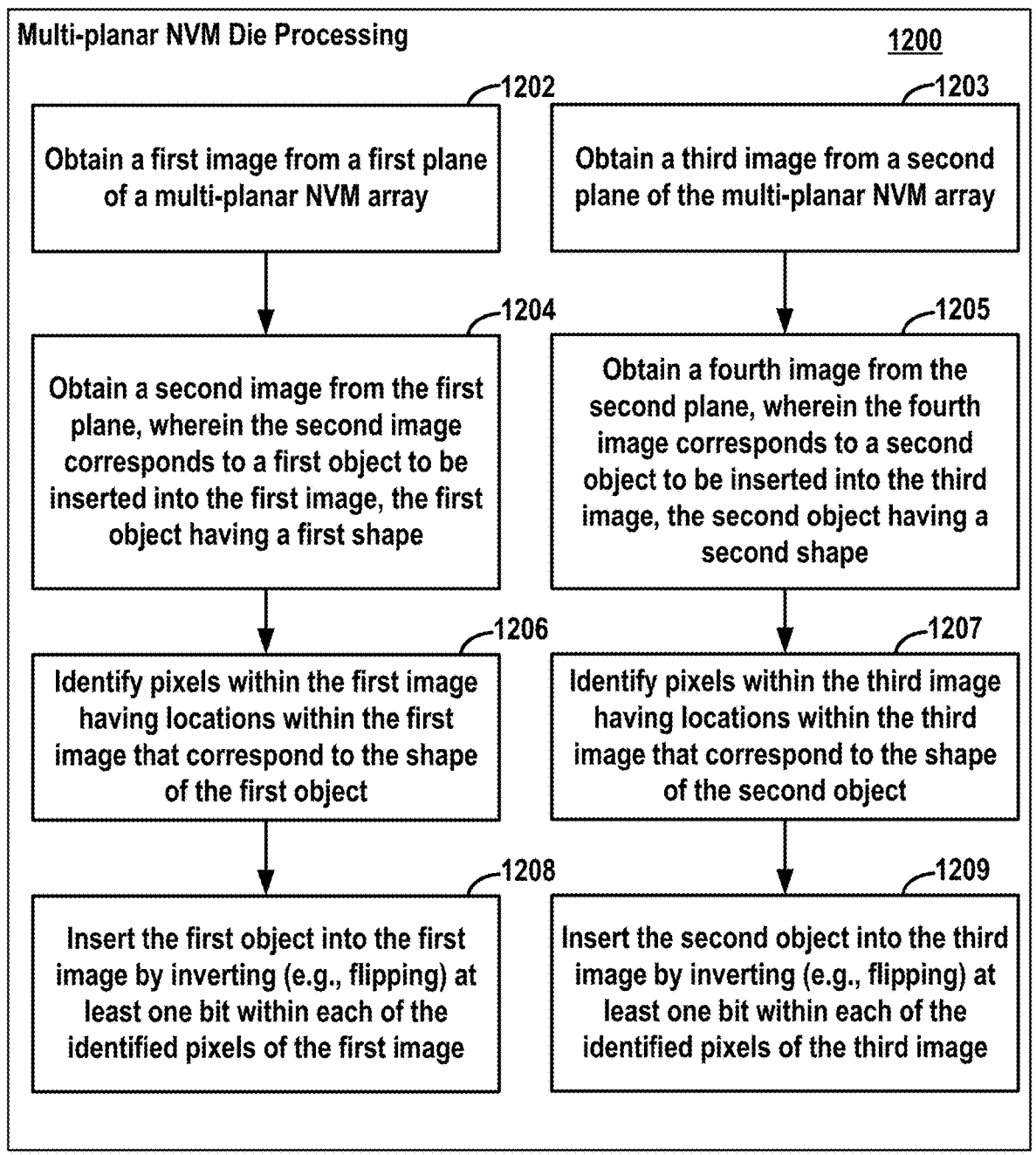
FIG. 12 is a flow chart of an exemplary method according to aspects of the present disclosure for inserting an object into an image for use with a multi-planar die.

FIG. 12 illustrates another exemplary method or process 1200 in accordance with some aspects of the disclosure, which particularly illustrates concurrent, parallel processing that may be performed using a multi-planar die. The process 1200 may take place within any suitable device (which may be a data storage device) or apparatus capable of performing the operations, such as a multi-planar NAND die configured with appropriate processing circuitry. See, for example, the device of FIG. 7, described above. At block 1202, the device obtains a first image from a first plane of a multi-planar NVM array. Concurrently and in parallel, at block 1202, the device also obtains a first image from a second plane of the multi-planar NVM array. At block 1204, the device obtains a second image from the first plane, wherein the second image corresponds to a first object to be inserted into the first image, the first object having a first shape. Concurrently and in parallel, at block 1203, the device also obtains a fourth image from the second plane, wherein the fourth image corresponds to a second object to be inserted into the third image, the second object having a second shape. At block 1206, the device identifies pixels within the first image having locations within the first image that correspond to the shape of the first object. Concurrently and in parallel, at block 1205, the device also identifies pixels within the third image having locations within the third image that correspond to the shape of the second object. At block 1208, the device inserts the first object into the first image by inverting (e.g., flipping) at least one bit within each of the identified pixels of the first image. Concurrently and in parallel, at block 12009, the device also inserts the second object into the third image by inverting (e.g., flipping) at least one bit within each of the identified pixels of the third image. In this manner, the multiple planes of the multiplanar NVM array die can be exploited for concurrent high-speed parallel processing of images.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. See, also, 3D XPoint (3DXP)) memories. Each type of memory device may have different configurations. For example, flash memory devices may be configured in a NAND or a NOR configuration.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:
1. A device, comprising:
a non-volatile memory (NVM) array formed on a die and configured to store a first image; and
processing circuitry formed on the die and configured to:
obtain a second image corresponding to an object to be inserted into the first image,
identify pixels within a target area of the first image for the object to be inserted, and
insert the object into the first image by inverting at least one bit within each of the identified pixels of the first image.

2. The device of claim 1, wherein the processing circuitry is configured to invert all bits within each of the identified pixels of the first image.

3. The device of claim 2, wherein the processing circuitry is configured to invert all bits within each of the identified pixels by XORing the identified pixels with binary 1s.

4. The device of claim 1, wherein the processing circuitry is configured to invert only a most significant bit (MSB) within each of the identified pixels.

5. The device of claim 1, wherein the processing circuitry is further configured to randomly determine the target area within the first image for insertion of the object.

6. The device of claim 1, wherein the processing circuitry is further configured to obtain the target area of the first image from a data storage controller.

7. The device of claim 1, wherein the processing circuitry is further configured to store at least a portion of the first and second images as bitmaps within first and second latches, respectively, and wherein the processing circuitry includes a barrel-shifter configured to shift bits within at least one of the first latch or the second latch to align a portion of the first image with a portion of the second image based on the target area.

8. The device of claim 1, wherein the processing circuitry is further configured to read at least one of the first image or the second image from the NVM array without error correction coding (ECC).

9. The device of claim 8, wherein the processing circuitry is further configured to (a) receive an indication of a failed detection of the object within the second image and, in response to the indication, (b) re-store at least one of the first image or the second image in the NVM array while using ECC.

10. The device of claim 1, wherein the processing circuitry is further configured to (a) receive an indication of a failed detection of the object within the second image and, in response to the indication, (b) re-store at least one of the first image or the second image in a different portion of the NVM array.

11. The device of claim 1, wherein the NVM array is a multi-planar array and wherein the processing circuitry is further configured to concurrently insert a plurality of the objects into a corresponding plurality of images obtained from separate planes of the NVM array.

12. A method for use with a device formed on a die having a non-volatile memory (NVM) array, the method comprising:
obtaining a first image from the NVM array;
obtaining a second image corresponding to an object to be inserted into the first image;
identify pixels within a target area of the first image for the object to be inserted; and
inserting the object into the first image by inverting at least one bit within each of the identified pixels of the first image.

13. The method of claim 12, wherein the inserting of the object into the first image by inverting at least one bit within each of the identified pixels of the first image comprises inverting all bits within each of the identified pixels of the first image.

14. The method of claim 13, wherein the inverting of all the bits within each of the identified pixels of the first image comprises XORing the identified pixels with binary 1s.

15. The method of claim 12, wherein the inserting of the object into the first image by inverting at least one bit within each of the identified pixels of the first image comprises inverting only a most significant bit (MSB) within each of the identified pixels of the first image is inverted.

16. The method of claim 12, wherein the target area within the first image for insertion of the object is randomly determined.

17. The method of claim 12, wherein the target area within the first image for insertion of the object is determined based on information obtained from a data storage controller.

18. The method of claim 12, wherein at least a portion of the first and second images are stored as bitmaps within first and second latches, respectively, and wherein a barrel-shifter shifts the bits within at least one of the first or second latches to align a portion of the first image with a portion of the second image based on the target area.

19. The method of claim 12, wherein at least one of the first image or the second image is read from the NVM array without error correction coding (ECC).

20. The method of claim 19, wherein the method further comprises receiving an indication of a failed detection of the object within the second image and, in response to the indication, at least one of the first image or the second image are re-stored in the NVM array while using ECC.

21. The method of claim 12, wherein the method further comprises receiving an indication of a failed detection of the object within the second image and, in response to the indication, at least one of the first image or the second image is re-stored in a different portion of the NVM array.

22. The method of claim 12, wherein the NVM array is a multi-planar array and wherein the method is performed to concurrently insert a plurality of the objects into a corresponding plurality of images obtained from separate planes of the NVM array.

23. An apparatus formed on a die that includes a non-volatile memory (NVM) array, the apparatus comprising:
means for obtaining a first image from the NVM array;
means for obtaining a second image corresponding to an object to be inserted into the first image;
means for identifying pixels within the first image having locations within the first image that correspond to the object to be inserted; and
means for inserting the object into the first image by inverting at least one bit within each of the identified pixels of the first image.

* * * * *